May 20, 1924.
E. H. VINCENT
STEERING WHEEL
Original Filed Sept. 7 1922   2 Sheets-Sheet 1
1,494,516
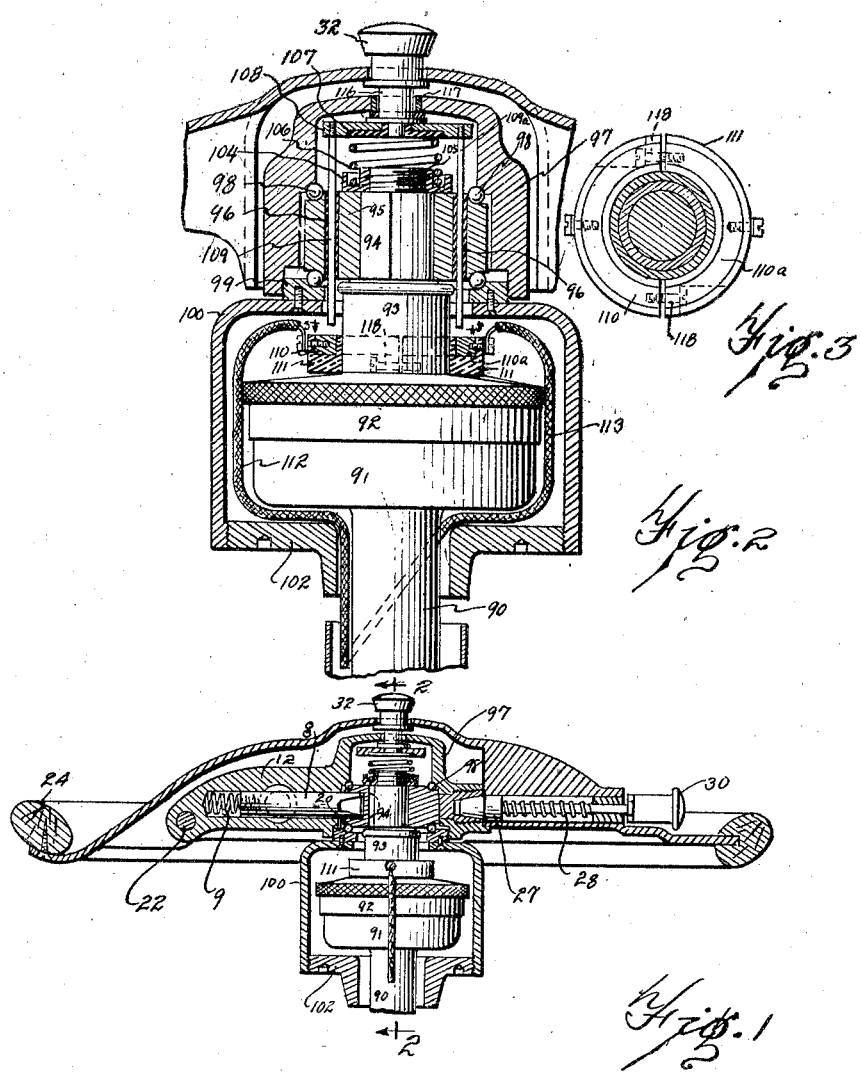
INVENTOR.
Edward H. Vincent

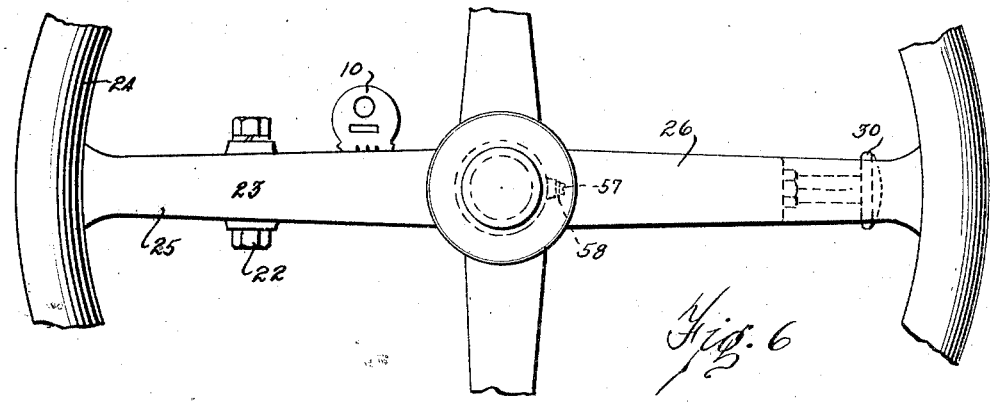
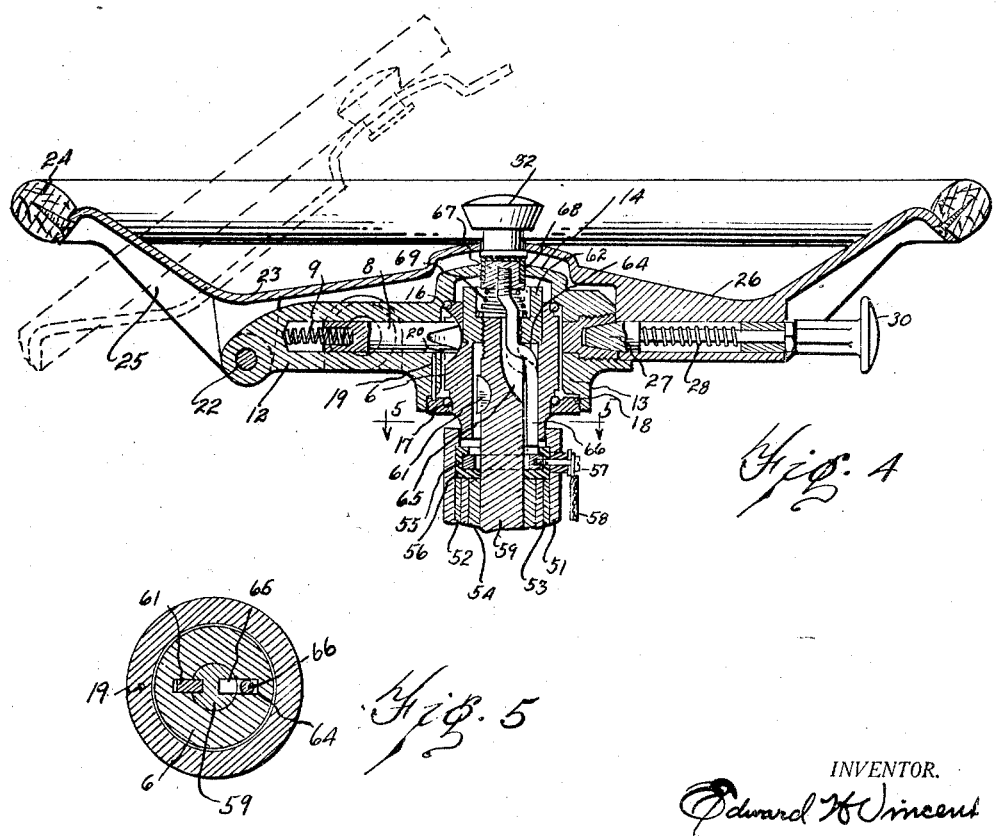

Patented May 20, 1924.

1,494,516

UNITED STATES PATENT OFFICE.

EDWARD H. VINCENT, OF DETROIT, MICHIGAN.

STEERING WHEEL.

Original application filed September 7, 1922, Serial No. 586,688. Divided and this application filed June 11, 1923. Serial No. 644,707.

*To all whom it may concern:*

Be it known that I, EDWARD H. VINCENT, a citizen of the United States, and residing at Detroit, in the county of Wayne and State of Michigan, have invented a new Improved Steering Wheel, of which the following is a specification.

This invention relates to steering wheels for automobiles, particularly to that type which embodies a hub portion adapted to be locked to and unlocked from the steering shaft of the vehicle, and a rim and spider portion pivoted on the hub portion, and its object is to provide a steering wheel of this character which shall be of great strength, which shall be simple in construction, and wherein the horn actuating member shall be mounted adjacent the upper end of a steering shaft and the electric contacts operated by the horn actuating member may be mounted on a casing for said shaft, removal of the actuating member and electric contacts being controlled by a key operated lock. The spider might also be of the nontilting type and secured rigidly to the wheel head.

Another object of the invention is to provide a collar or bushing secured to the steering shaft, the hub portion of the wheel head being mounted on said bushing which shall have openings through which other contact members move to engage the electric contacts on the shaft-casing. Carried by the head is a protective case which is adapted to protect and encompass the electric contacts, the wires connected thereto and the upper end of the shaft-casing.

In the accompanying drawings, Fig. 1 is a vertical section of the steering wheel embodying this invention. Fig. 2 is a section on the line 2—2 of Fig. 1 on a larger scale. Fig. 3 is a section on the line 3—3 of Fig. 2. Fig. 4 is a vertical section similar to Fig. 1 of another modified form of a steering wheel embodying this invention. Fig. 5 is a section on the line 5—5 of Fig. 4. Fig. 6 is a plan of Fig. 4.

The structure shown in Figs. 1, 2, 3, 4 and 5 are reproductions of Figs. 9, 10, 11, 4 and 5 respectively of my pending application Serial Number 586,688 filed September 7, 1922, and this present application is a division thereof.

On the steering shaft 59 and secured thereto by a key 61 is a hard steel bushing 6 which is formed with a notch 7 to receive the locking bolt 8. This locking bolt is normally held inward by means of a spring 9 but may be withdrawn by means of a key 10. The particular construction used to connect the lock which is controlled by this key 10 to the bolt 8 is not shown, as it forms no part of the present invention.

In the construction shown in Fig. 4, the steering column 51 encloses usual tubes 52 and 53 by means of which the spark and throttle are controlled, the mechanism for this control being omitted as it forms no part of this invention. A collar 55 of insulating material is mounted in the upper end of the column 51 and carries a contact ring 56 of metal to which the screw 57 and the conductor wire 58 connect. This conductor wire 58 extends to the horn of the vehicle.

This bolt 8 and the lock which operates it are mounted in an arm 12 extending from the hard steel hub 13 of the steering wheel head. This hub has a central cap portion 14 which extends over the nut 62 by means of which the bushing 6 is held in position on the shaft 3. Bearing balls 16 are positioned between recesses formed within the hub 13 and at the upper end of the bushing 6 and other bearing balls 17 are in recesses formed in the bushing 6 and in a hard steel nut 18 which screws up into the hub. This nut is normally prevented from turning by means of a pin 19 which extends into notches in this nut but which pin is permitted to move up and down by reason of the notch 20 in the locking bolt 8 when that locking bolt is in operative position. When, however, the locking bolt is withdrawn so that the wheel can spin freely on the bushing 6, then this notch is no longer over the pin 19 and the bolt therefore will prevent the nut 18 from being turned back to permit the removal of the steering wheel head from the bushing 6.

The arm 12 carries a pin 22 on which one of the arms 23 of the spider of the steering wheel is mounted, the rim 24 connecting to the ends of the arms in the usual manner. The arm 23 is provided with sides 25 through which the pin 22 extends and which enclose the arm 12 on the hub except at that point where the key 10 is introduced, at which point the one side 25 has a notch. These details are not illustrated as they form no part of the present invention.

The arm 26 which is opposite the arm 23 carries a locking pin 27 normally held inwardly by a spring 28 to engage in the bushing 29 mounted in the hub 13. This pin can be withdrawn by means of the button 30 so as to permit the wheel rim and spider to be swung up to the position shown in dotted lines in Fig. 4.

The head 6 is formed with a recess 64 and the shaft is formed with a recess 65 in which a stem 66 is mounted. The upper end of this stem screws into a cylindrical button 67 around which is loosely mounted a hardened steel shroud 68. It is evident that the shroud 68 could be constructed so as to be supported on and carried by the hub portion 14. In this construction the stem 66 turns with the bushing 6 and with the steering shaft 59. It is conceivable that a wedge could be driven in between the button 67 and the wall of the opening in the top 14 of the hub 13 and that thereby the steering shaft might be turned. By having this steel shroud 68 loose on the button 67, a wedge driven in between it and the edge of the opening would merely cause the shroud to turn without turning the button and the shaft. This button is normally held in its uppermost position by means of the spring 69 but can be depressed by means of the horn button 32 which causes the lower end of the stem 66 to engage with the contact ring 56 and thus close the circuit between the contact ring and the metal parts of the steering mechanism which acts as a ground for the electric circuit and thereby complete the circuit between the storage battery of the automobile and the horn.

The embodiment of this invention shown in Figs. 1, 2 and 3 is particularly adapted for use on Ford automobiles. In this case, the steering column 90 supports the usual gear casing 91 provided with a cap 92 which has a neck 93 that constitutes a bearing for the stub shaft 94 which drives the central pinion of this gear mechanism. Secured to this shaft 94 is a bushing 95 in the form of a collar which has vertical holes in which the tubes 96 of insulating material are mounted. The hub 97 of the steering wheel is carried by the bearing balls 98, the lower set of which engage the nut 99 which screws up into this hub. A hardened steel cover 100 extends over and around the gear case and its lower end is closed by means of a hardened ring 102 which is tightly screwed into the lower end of the cover and thereby prevents access to the wires and contacts. As this cover 100 and its ring 102 are preferably of hardened steel, the contacts and wires are fully protected.

The spider of this steering wheel is again provided with a central opening in which the horn button 32 is mounted. A nut 104 screws onto the upper end 105 of the shaft 94 and carries a spring 106 which presses against the disk 107 of insulating material carried by the metal disk 108. The stems 109 and 109$^a$ extend down from this metal disk 108 and when the horn button is depressed they contact with the semi-circular contacts 110 and 110$^a$ which are mounted in the collar 111 of insulating material attached to the neck 93 of the cap 92 of the gear box. These semi-circular contacts 110 and 110$^a$ connect respectively with the conductors 112 and 113 which extend down around the steering column 90. This collar 111 is preferably in two parts which are secured to the neck 93 of the gear box cap by means of screws 118.

When the horn button 32, which is of insulating material, is depressed, current passes over the conductor 112, one semicircular contact 110, stem 109, the disk 108 to the hardened plunger 116 thereon, but as this plunger 116 slides in an insulating sleeve 117, no current can pass to the hub 97 and be lost. As the horn button 32 is of insulating material, no current can pass to the spider. The current, therefore, passes down the other stem 109$^a$ to the semi-circular contact 110$^a$ and to the wire 113. One of these wires connects to the sounding horn and the other wire to the battery, the horn and battery being connected by means of other conductors.

It will therefore be noted that in each one of these cases the steering wheel is pivoted on a wheel head and can be swung up to give more clearance at the steering column. The horn button 32 is mounted on the spider of the steering wheel and is lifted therewith. This button normally contacts with a member which is permanently positioned at the upper end of the steering shaft and which is accessible when the steering wheel is swung up so that the horn can be sounded at all times.

The details and proportions, however, of the various parts of this construction may all be changed by those skilled in the art without departing from the spirit of my invention as set forth in the following claims.

I claim:—

1. In steering mechanism, a shaft-casing, a pair of electric contacts attached thereto, a case enclosing said contacts and preventing access thereto, a shaft in said casing, a bushing mounted on the shaft and having longitudinal holes, a pair of stems slidable in said holes to engage said contacts on the shaft casing, and manually operable means whereby said stems may be caused to move toward said contacts on the shaft casing.

2. In steering mechanism, a shaft-casing, a pair of electric contacts attached thereto, a case enclosing said contacts and preventing access thereto, a shaft in said casing, a bushing mounted on the shaft and having longitudinal holes, a pair of stems slidable in said holes to engage said contacts on the shaft casing, and manually operable means whereby said stems may be caused to move toward said contacts on the shaft casing, said contacts on the casing embodying substantially semi-circular contact faces, and said stems being carried in a circular path when the shaft is turned.

3. In steering mechanism, electric contacts, a steering shaft, a bushing mounted thereon and having a plurality of openings, members movable in said openings to engage said contacts, and manually operable means whereby said members may be caused to engage said contacts, and means to normally hold the members out of engagement with the contacts.

4. In steering mechanism, a shaft-casing, electric contacts attached thereto and insulated therefrom, a shaft in said casing, a bushing mounted on the shaft and having openings, members movable in said openings to engage said contacts on the shaft-casing, manually operable means whereby said members may be caused to engage said contacts, and means to normally hold the members out of engagement with said contacts.

5. In steering mechanism, a stationary shaft-casing, electric contacts rigidly attached thereto and insulated therefrom, a shaft rotatable in said casing, a bushing mounted on the shaft and having openings, members movable in said openings to engage said contacts on the shaft-casing, means whereby said members may be caused to engage said contacts, and a spring to normally hold the members out of engagement with said contacts.

6. In steering mechanism, a stationary shaft-casing, electric contacts rigidly attached thereto and insulated therefrom, a shaft rotatable in said casing, a bushing mounted on the shaft and having openings, members movable in said openings to engage said contacts on the shaft casing, means whereby said members may be caused to engage said contacts, and resilient means to normally hold the members out of engagement with said contacts.

7. In steering mechanism, a stationary shaft-casing, an electric contact attached to and encompassing said shaft-casing and insulated therefrom, a shaft rotatable in said casing, a bushing mounted on the shaft and having an opening, a member movable in said opening to engage said contact on the shaft-casing, means mounted above said bushing whereby said member may be caused to engage said contact, and resilient means above said bushing adapted to engage said first mentioned means to normally hold said member out of engagement with said contact.

8. In steering mechanism, a stationary shaft-casing, an electric contact attached to and encompassing said shaft-casing and insulated therefrom, a shaft rotatable in said casing, a bushing mounted on the shaft above said contact and having an opening, a member movable in said opening to engage said contact on the shaft-casing, means whereby said member may be caused to engage said contact, resilient means adapted to engage said first mentioned means to normally hold said member out of engagement with said contact, and a wheel head rotatably encompassing said bushing said member said first mentioned means and said resilient means.

9. In steering mechanism, a stationary shaft-casing, an electric contact attached to said shaft-casing and insulated therefrom, a shaft rotatable in said casing, a bushing mounted on the shaft and having an opening, a member movable in said opening to engage said contact on the shaft-casing, means whereby said member may be caused to engage said contact, resilient means to normally hold said member out of engagement with said contact, and a wheel head encompassing and preventing removal of said bushing said member said first mentioned means and said resilient means.

10. In steering mechanism, a shaft-casing, electric contacts removably attached to and encompassing said shaft-casing and insulated therefrom, a shaft in said casing, members carried by said shaft to engage said contacts on the shaft-casing, means to normally hold said members out of engagement with said contacts, and electric wires attached to said contacts and connected to an electric sounding horn.

11. In steering mechanism, a shaft-casing, electric contact means removably attached to and encompassing said shaft casing and insulated therefrom, a shaft in said casing, movable contact means carried by said shaft to engage said electric contact means on the shaft-casing, means whereby said movable contact means may be caused to engage said electric contact means on the shaft-casing thereby completing an electric circuit, and means to normally hold said movable contact means out of engagement with said electric contact means on the shaft-casing.

12. In steering mechanism, electric contact means, a steering shaft, a metallic bushing mounted thereon and having an opening, a hollow bushing of insulating material mounted in said opening in the metallic bushing, a metallic member movable in said hollow insulating bushing to engage said electric contact means, means whereby said metallic member may be caused to engage said electric contact means, and means to normally hold the metallic member out of engagement with said electric contact means.

13. In steering mechanism, a shaft-casing having its upper end enlarged and forming a flange, a cap having a flange adapted to fit over the flange of the shaft-casing and having a reduced neck portion including a shoulder, separate electric contacts removably attached to and encompassing the neck of the cap between its flange and shoulder and insulated therefrom, movable contact means carried by the shaft to engage said electric contacts attached to said cap, means whereby said movable contact means may be caused to engage said electric contacts attached to said cap, and means to normally hold said movable contact means out of engagement with said electric contacts attached to said cap.

14. In steering mechanism, a shaft-casing, a cap mounted on the upper end of the shaft casing, electric contacts attached to said cap, electric wires connected to said electric contacts, movable contact means carried by the shaft to engage said electric contacts attached to said cap, and a protective case encompassing said electric contacts said wires said cap and the upper end of said shaft-casing, said protective case also preventing removal of the cap the electric contacts and wires, said protective case having an opening through which said wires pass out of said case.

15. In steering mechanism, a shaft, a head mounted thereon, a wheel spider carried by said head, electric contact means encompassing said shaft, movable contact means normally out of engagement with said electric contact means, and means carried by and operable above said wheel spider adapted to move said second mentioned contact means into engagement with said first mentioned electric contact means.

16. In steering mechanism, a shaft, a wheel spider to rotate said shaft, electric contact means encompassing said shaft, movable contact means normally out of engagement with said electric contact means, and means carried by said wheel spider adapted to move said second mentioned contact means into engagement with said first mentioned electric contact means.

17. In steering mechanism, a shaft, a head mounted thereon, a wheel spider tiltable on the head to operative or inoperative positions, a contact ring encompassing said shaft, a spring pressed movable contact member normally out of engagement with said contact ring, and a manually operable button above said wheel spider adapted to move said contact member into engagement with said contact ring, when said spider is in operative position on the head.

18. In steering mechanism, a shaft, a head mounted thereon, a wheel spider movable on the head to operative or inoperative positions, an electric contact encompassing said shaft, a movable contact pin normally out of engagement with said electric contact, a member adapted to move said contact pin into engagement with said electric contact when said spider is in operative position on the head, and means to lock the spider in operative position on the head.

19. In steering mechanism, a shaft, a head mounted thereon, a wheel spider movable on the head to operative or inoperative positions, electric contact means encompassing said shaft, movable contact means normally out of engagement with said electric contact means, an operating member adapted to move said contact means into engagement with said electric contact means when said spider is in operative position on the head, the engagement of said movable contact means with said electric contact means by said operating member being impossible when said spider is in inoperative position on the head.

20. In steering mechanism, a head mounted thereon, a wheel spider movable on the head to operative or inoperative positions, an electric contact adjacent the upper end of said shaft, a slidable contact and resilient means to hold it out of engagement with said electric contact, manually operative means carried by said spider and adapted to move said slidable contact into engagement with said electric contact when said spider is in operative position on the head, the engagement of said slidable contact with said electric contact by said manually operative means being impossible when said spider is in inoperative position on the head, and means to lock the spider in operative position on the head.

21. In steering mechanism, a shaft-casing, a cap mounted thereon, electric contacts attached to said cap but insulated therefrom, electric wires connected to said electric contacts, and a protective case enclosing said electric contacts.

22. In steering mechanism, a shaft-casing, a flanged cap mounted on said shaft-casing and having a reduced neck portion, electric contacts removably attached to the neck of said cap but insulated therefrom, electric wires connected to said electric contacts, and a protective case encompassing said cap and wires and adapted for rotation about said cap and wires.

23. In steering mechanism, a shaft-casing, a cap mounted thereon and comprising a circular flange and a cylindrical neck portion, electric contacts carried by the neck of said cap but insulated therefrom, a protective case encircling said cap and said contacts, said shaft-casing and cap spaced from said protective case, electric wires connected to said contacts and passing through the space between said protective case and shaft-casing.

24. In steering mechanism, a rotatable shaft, a shaft-casing having its upper end enlarged and forming a circular flange, a cap comprising a circular flange fitted to the flange of the shaft-casing and a reduced cylindrical neck portion projecting from the flange of the cap, a steering wheel hub mounted on the shaft adjacent the neck of said cap, disengaged electrical contacts carried by said neck between the flange of the cap and the wheel hub, said electrical contacts insulated from said cap, electrical wires connected to said electrical contacts, and a protective case carried by said wheel hub and encircling said cap, said electrical contacts, and said electrical wires.

EDWARD H. VINCENT.